United States Patent
Sircar et al.

[11] Patent Number: 5,753,010
[45] Date of Patent: May 19, 1998

[54] HYDROGEN RECOVERY BY PRESSURE SWING ADSORPTION INTEGRATED WITH ADSORBENT MEMBRANES

[75] Inventors: Shivaji Sircar, Wescosville; William Emil Waldron, North Catasauqua; Madhu Anand; Madhukar Bhaskara Rao, both of Allentown, all of Pa.

[73] Assignee: Air Products and Chemicals, Inc., Allentown, Pa.

[21] Appl. No.: 736,846

[22] Filed: Oct. 28, 1996

[51] Int. Cl.[6] .................... B01D 53/047; B01D 53/22
[52] U.S. Cl. .................... 95/45; 95/50; 95/51; 95/98; 95/105; 95/139; 95/140; 95/143
[58] Field of Search .................... 95/45, 50, 51, 95/96–98, 100–105, 139, 140, 143

[56] References Cited

U.S. PATENT DOCUMENTS

| | | | |
|---|---|---|---|
| 3,430,418 | 3/1969 | Wagner | 55/25 |
| 3,986,849 | 10/1976 | Fuderer et al. | 55/25 |
| 4,512,779 | 4/1985 | Hay | 95/100 |
| 4,816,039 | 3/1989 | Krishnamurthy et al. | 95/97 |
| 4,863,492 | 9/1989 | Doshi et al. | 95/98 X |
| 5,004,482 | 4/1991 | Haas et al. | 95/96 X |
| 5,104,425 | 4/1992 | Rao et al. | 55/16 |
| 5,332,424 | 7/1994 | Rao et al. | 95/50 X |
| 5,354,547 | 10/1994 | Rao et al. | 423/650 |
| 5,431,864 | 7/1995 | Rao et al. | 264/29.5 |
| 5,435,836 | 7/1995 | Anand et al. | 95/45 |
| 5,447,559 | 9/1995 | Rao et al. | 96/4 |
| 5,507,856 | 4/1996 | Rao et al. | 95/50 |
| 5,507,860 | 4/1996 | Rao et al. | 96/12 |
| 5,632,803 | 5/1997 | Stoner et al. | 95/105 X |

*Primary Examiner*—Robert Spitzer
*Attorney, Agent, or Firm*—John M. Fernbacher

[57] ABSTRACT

A method for increasing product recovery or reducing the size of steam methane reformer and pressure swing adsorption systems utilized for hydrogen production. A significant portion of the hydrogen in the PSA depressurization and purge effluent gas, which is otherwise burned as fuel in the reformer, is recovered and recycled to the PSA system to provide additional high purity hydrogen product. This is accomplished by processing selected portions of the depressurization and purge effluent gas in adsorbent membrane separators to increase hydrogen content for recycle to the PSA system. Remaining portions of the depressurization and purge effluent gas which contain lower concentrations of hydrogen are utilized for fuel value in the reformer.

29 Claims, 4 Drawing Sheets

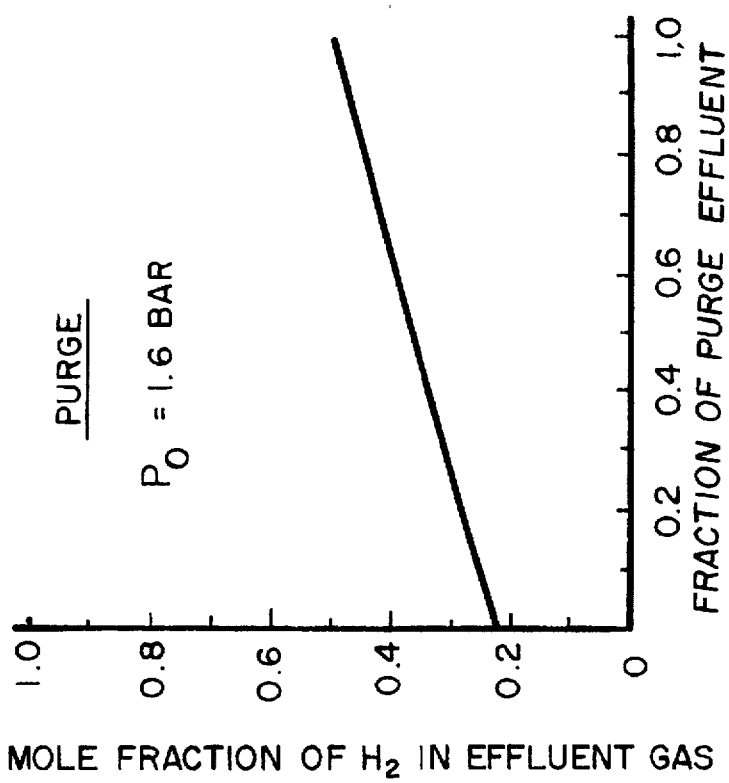
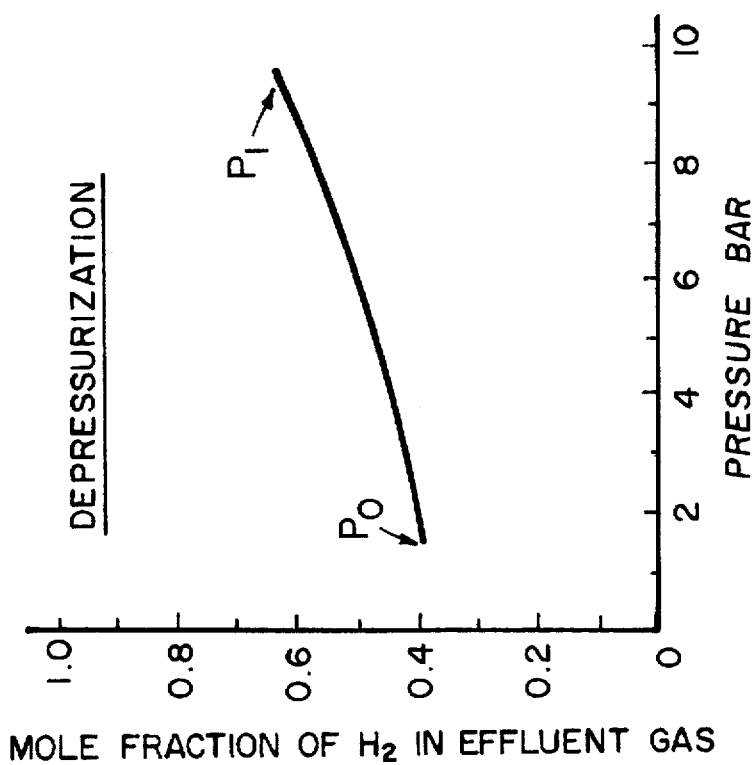

HYDROGEN RECOVERY BY PRESSURE SWING ADSORPTION INTEGRATED WITH ADSORBENT MEMBRANES

STATEMENT REGARDING FEDERALLY SPONSORED RESEARCH OR DEVELOPMENT

Not Applicable

CROSS-REFERENCE TO RELATED APPLICATIONS

Not Applicable

BACKGROUND OF THE INVENTION

The invention pertains to the recovery of hydrogen from gas mixtures, and in particular to improved hydrogen recovery by the combined use of pressure swing adsorption and adsorbent membrane separation methods.

Hydrogen is recovered from gas mixtures by the well-known pressure swing adsorption method in which impurities are adsorbed to yield a high purity hydrogen product and one or more reject streams containing the removed impurities and residual hydrogen. In the commercial production of hydrogen, such gas mixtures typically are produced by steam reforming of methane combined with a water gas shift reaction step to maximize the conversion of methane to hydrogen. Product purity above 99.9 vol % hydrogen can be achieved by pressure swing adsorption (PSA) at high hydrogen recovery. Representative PSA processes for hydrogen recovery are described in U.S. Pat. Nos. 3,430,418 and 3,986,849.

Adsorbent membranes have been developed which utilize a thin layer of nanoporous adsorbent material on a meso-macroporous support, wherein the adsorbent material selectively adsorbs and permeates impurities from a hydrogen-containing feed stream. The process yields a hydrogen-enriched stream at near feed pressure and a permeate stream at low pressure containing a significant portion of the impurities. Adsorbent membranes for this type of separation are described in representative U.S. Pat. Nos. 5,104,425, 5,431,864, and 5,507,860.

PSA processes can be integrated with adsorbent membrane separators to increase the recovery of hydrogen and/or reduce the size of the PSA systems. This is accomplished by pretreating the hydrogen-containing feed gas in an adsorbent membrane separator to increase the hydrogen content of the feed to the PSA system as disclosed in U.S. Pat. Nos. 5,354,547, 5,447,559, and 5,507,856. Alternatively, PSA reject streams containing residual hydrogen can be processed in one or more adsorbent membrane separators to yield a stream enriched in hydrogen for recycle to the PSA system as described in U.S. Pat. No. 5,435,836.

The demand for hydrogen is growing in the chemical process industries, in particular for hydrotreating in petroleum refineries to produce clean-burning fuels from heavier feedstocks. This growing demand increases the economic need for further improvements in hydrogen production and recovery, which can be addressed by new integrated PSA-adsorbent membrane systems. The invention described below and defined in the claims which follow offers an improved PSA-adsorbent membrane method and system for increased hydrogen recovery, reduced PSA system size, and reduced natural gas requirements in steam-methane reforming for hydrogen production.

BRIEF SUMMARY OF THE INVENTION

Pressure swing adsorption processes are known which separate a pressure swing adsorption feed gas mixture comprising one or more primary components and one or more secondary components into a product stream enriched in the primary components and one or more reject streams enriched in the secondary components, wherein the secondary components are more strongly adsorbed on an adsorbent material and the primary components are less strongly adsorbed on the adsorbent material. Such a process includes at least the steps of (a) passing the pressure swing adsorption feed gas mixture through an adsorption zone at a first pressure wherein the secondary components are selectively adsorbed on the adsorbent material therein and a product stream enriched in the primary components is withdrawn therefrom, (b) isolating the adsorption zone and depressurizing the zone by withdrawing therefrom desorbed and void space gas as a stream of depressurization gas, and (c) purging the resulting depressurized adsorption zone of step (b) with a purge gas stream and withdrawing therefrom a purge gas effluent.

The present invention provides a method for improving the recovery of the primary components in the product stream which comprises:

(1) selectively segregating either the depressurization gas or the purge effluent gas by
   (1a) dividing the depressurization gas into at least a first portion obtained during a first period of the depressurization step and a second portion obtained during a second period of the depressurization step; or
   (1b) dividing the purge effluent gas into at least a first portion obtained during a first period of the purge step and a second portion obtained during a second period of the purge step;

(2) passing either the first portion of depressurization gas or the second portion of the purge effluent gas as a membrane feed gas through a membrane separation zone having a permeable adsorbent membrane which divides the zone into a feed side and a permeate side, wherein the membrane feed gas passes through the feed side of the membrane separation zone and portions of the secondary components selectively adsorb and permeate through the membrane to the permeate side;

(3) withdrawing from the permeate side of the membrane separation zone a permeate stream which is further enriched in the secondary components and withdrawing from the feed side of the membrane separation zone a nonpermeate stream which is depleted in the secondary components and enriched in the primary components; and (4) combining the nonpermeate stream with the pressure swing adsorption feed gas mixture and passing the combined gas stream through the adsorption zone.

In one embodiment, the depressurization gas is divided into at least a first portion obtained during a first period of the depressurization step and a second portion obtained during a second period of the depressurization step, and the method comprises (a) passing the first portion of depressurization gas as the membrane feed gas through the membrane separation zone having a permeable adsorbent membrane which divides the zone into a feed side and a permeate side, wherein the depressurization gas passes through the feed side of the membrane separation zone and portions of the secondary components selectively adsorb and permeate through the membrane as a mobile adsorbed phase to the permeate side;

(b) withdrawing from the permeate side of the membrane separation zone the permeate stream which is further enriched in the secondary components and withdrawing from the feed side of the membrane separation zone the nonpermeate stream which is depleted in the secondary components and enriched in the primary components; and (c) recycling the nonpermeate stream to the pressure swing adsorption process to increase the recovery of the primary components in the product stream.

In one preferred application of the invention, the secondary components comprise methane and carbon oxides, and the primary components comprise hydrogen. The pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor. The second portion of depressurization gas obtained during the second period of the depressurization step can be utilized if desired as additional fuel to provide heat for the steam reforming reactor. Optionally, the permeate stream which is further enriched in the secondary components is utilized as additional fuel to provide heat for the steam reforming reactor. The permeate side of the membrane separation zone can be swept with a sweep gas if desired, wherein a mixture of permeate and sweep gas is withdrawn and utilized as additional fuel to provide heat for the steam reforming reactor.

In another embodiment, the purge effluent gas is divided into at least a first portion obtained during a first period of the purge step and a second portion obtained during a second period of the purge step, and the method further comprises (d) passing the second portion of purge effluent gas as the membrane feed gas through an additional membrane separation zone having a permeable adsorbent membrane comprising adsorbent material which divides the zone into a feed side and a permeate side, wherein the membrane feed gas passes through the feed side of the additional membrane separation zone and portions of the secondary components selectively adsorb and permeate through the membrane as a mobile adsorbed phase to the permeate side;

(e) withdrawing from the permeate side of the additional membrane separation zone an additional permeate stream which is further enriched in the secondary components and withdrawing from the feed side of the additional membrane separation zone an additional nonpermeate stream which is depleted in the secondary components and enriched in the primary components; and (f) recycling the additional nonpermeate stream to the pressure swing adsorption process to increase the recovery of the primary components in the product stream.

In this embodiment, the secondary components preferably comprise methane and carbon oxides, and the primary components comprise hydrogen. The pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor. Optionally, the additional permeate stream which is further enriched in the secondary components is utilized as additional fuel to provide heat for the steam reforming reactor. In another optional step, the permeate side of the additional membrane separation zone is swept with a sweep gas, and a mixture of permeate and sweep gas is withdrawn therefrom and utilized as additional fuel to provide heat for the steam reforming reactor. If desired, the first portion of purge effluent gas can be utilized as additional fuel to provide heat for the steam reforming reactor.

In an alternative embodiment, the method further comprises (d) passing the second portion of depressurization gas as a membrane feed gas through an additional membrane separation zone having a permeable adsorbent membrane which divides the zone into a feed side and a permeate side, wherein the membrane feed gas passes through the feed side of the additional membrane separation zone and portions of the secondary components selectively adsorb and permeate through the membrane as a mobile adsorbed phase to the permeate side;

(e) withdrawing from the permeate side of the additional membrane separation zone an additional permeate stream which is further enriched in the secondary components and withdrawing from the feed side of the additional membrane separation zone an additional nonpermeate stream which is depleted in the secondary components and enriched in the primary components; and (f) recycling the additional nonpermeate stream to the pressure swing adsorption process to increase the recovery of the primary components in the product stream.

In this alternative embodiment, the secondary components preferably comprise methane and carbon oxides, and the primary components comprise hydrogen. The pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor. The additional permeate stream which is further enriched in the secondary components may be utilized if desired as additional fuel to provide heat for the steam reforming reactor. Optionally, the permeate side of the additional membrane separation zone is swept with a sweep gas, and a mixture of permeate and sweep gas is withdrawn therefrom and utilized as additional fuel to provide heat for the steam reforming reactor. In a further option, the depressurization gas is divided into a third portion obtained during a third period of the depressurization step and this third portion is utilized as additional fuel to provide heat for the steam reforming reactor.

In an optional step in this alternative embodiment, the purge effluent gas is divided into at least a first portion obtained during a first period of the purge step and a second portion obtained during a second period of the purge step, and the second portion of purge effluent gas is combined with the second portion of depressurization gas and passed through the additional membrane separation zone. In this additional step, the secondary components preferably comprise methane and carbon oxides, and the primary components preferably comprise hydrogen. The pressure swing adsorption feed gas mixture typically is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor.

The additional permeate stream which is further enriched in the secondary components can be utilized if desired as additional fuel to provide heat for the steam reforming reactor. Optionally, the permeate side of the additional membrane separation zone is swept with a sweep gas, and a mixture of permeate and sweep gas is withdrawn therefrom and utilized as additional fuel to provide heat for the steam reforming reactor. In addition, the first portion of purge effluent gas can be utilized as additional fuel to provide heat for the steam reforming reactor. The depressurization gas optionally is divided into a third portion obtained during a third period of the depressurization step and the third portion is used as additional fuel to provide heat for the steam reforming reactor.

In the embodiments described above, the depressurization gas is divided into at least a first portion obtained during a first period of the depressurization step and a second portion obtained during a second period of the depressurization step, and the first portion is separated further in a membrane separation zone. In a different and alternative mode of the invention, the second portion is processed by the steps of (a) passing the second portion of depressurization gas as the membrane feed gas through an additional membrane separation zone having a permeable adsorbent membrane which divides the zone into a feed side and a permeate side, wherein the depressurization gas passes through the feed side of the additional membrane separation zone and portions of the secondary components selectively adsorb and permeate through the membrane as a mobile adsorbed phase to the permeate side;

(b) withdrawing from the permeate side of the additional membrane separation zone an additional permeate stream which is further enriched in the secondary components and withdrawing from the feed side of an additional membrane separation zone the nonpermeate stream which is depleted in the secondary components and enriched in the primary components; and (c) recycling the additional nonpermeate stream to the pressure swing adsorption process to increase the recovery of the primary components in the product stream.

The first portion of the depressurization gas can be recycled directly to the pressure swing adsorption process to further increase the recovery of the primary components in the product stream. As in the alternative embodiments described above, the pressure swing adsorption feed gas mixture can be provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor. In a further alternative mode of the invention, the depressurization gas is divided into a third portion obtained during a third period of the depressurization step and the third portion is utilized as additional fuel to provide heat for the steam reforming reactor.

BRIEF DESCRIPTION OF THE SEVERAL VIEWS OF THE DRAWINGS

FIG. 2A is a plot of depressurization gas composition as a function of pressure during the depressurization step in a pressure swing adsorption process.

FIG. 2B is a plot of purge effluent gas composition as a function of the fraction of purge effluent gas quantity during the purge step in a pressure swing adsorption process.

DETAILED DESCRIPTION OF THE INVENTION

Figure 1:
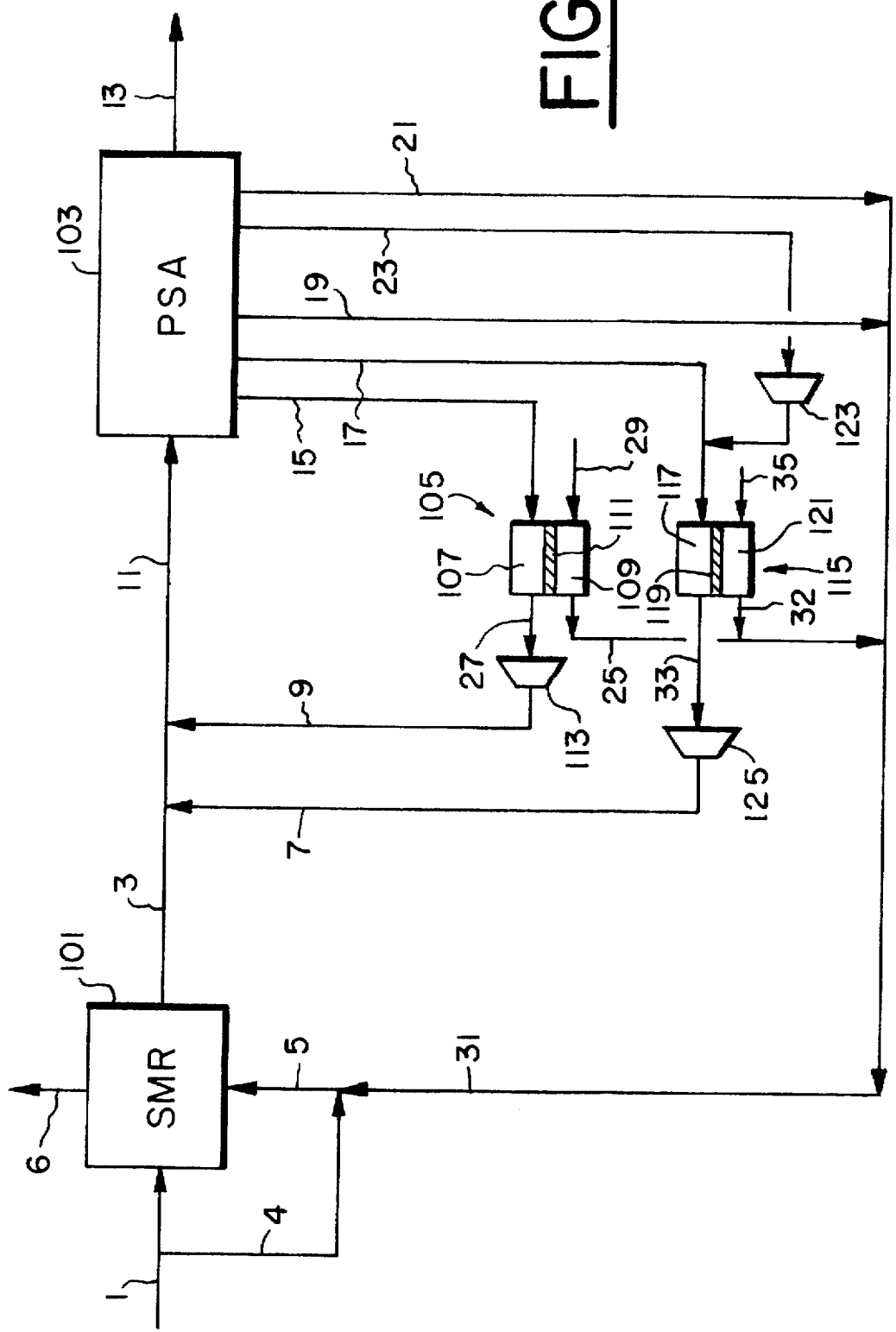
FIG. 1 is a schematic flow diagram of the process of the present invention.

The present invention is a method to improve the recovery of primary components from any mixture of primary components and secondary components by a pressure swing adsorption (PSA) system. The improvement utilizes an adsorbent membrane system to concentrate the primary components in the PSA depressurization gas stream, purge gas effluent stream, or both the depressurization and purge gas effluent streams. In a preferred embodiment, the present invention is utilized to improve the recovery of high purity hydrogen by PSA from a steam-methane reformate utilizing one or more adsorbent membrane systems in which carbon oxides and methane comprise the secondary components and hydrogen comprises a primary component. The steam-methane reformate typically is saturated with water vapor, which behaves as a secondary component.

The definition of the term "adsorbent membrane" as used in the present disclosure means any gas-permeable membrane containing adsorbent material which selectively adsorbs some of the components in a gas mixture, wherein portions of the adsorbed components permeate through the membrane as a mobile adsorbed phase. A representative type of adsorbent membrane is described in U.S. Pat. No. 5,104,425 which is incorporated herein by reference. Other types of adsorbent membranes can be utilized in the present invention, for example, membranes which utilize a polymeric material to support or contain the adsorbent material.

The following description of the invention is based on the preferred embodiment of recovering hydrogen from steam-methane reformate which contains primarily water, hydrogen, carbon oxides, and methane. The carbon oxides are carbon monoxide and carbon dioxide, and the relative concentrations of these two oxides in the reformate will be determined by the end products to be recovered. A representative reformate composition is 73.8% hydrogen, 9.4% carbon dioxide, 12.0% carbon monoxide, and 4.8% methane (compositions in mole % on a dry basis); the composition may vary depending on reformer operating conditions. When hydrogen is the sole product, the raw reformate from the reformer reactor system is subjected to the water gas shift reaction to convert a part of the carbon monoxide into additional hydrogen and carbon dioxide. A representative reformate composition after shift is 75.8% hydrogen, 16.7% carbon dioxide, 3.0% carbon monoxide, and 4.5% methane (compositions in mole % on a dry basis); the composition may vary depending on shift reactor operating conditions. In such gas mixtures, hydrogen is the primary component relative to both the PSA adsorbent and the adsorbent material on the adsorbent membrane. The water, carbon oxides, and methane are the secondary components which are more strongly adsorbed on these adsorbents.

The following specific description of the integrated PSA and adsorbent membrane system for separating steam-methane reformate gas mixtures is representative of any gas mixture which contains secondary components (characterized herein by water, carbon oxides, and methane)

and primary components (characterized herein by hydrogen), and the description therefore also supports the generic separation of any mixture containing secondary and primary components. Other such mixtures include refinery waste streams containing hydrogen and light hydrocarbons, mixtures of helium and natural gas components, and the like.

In the schematic flowsheet of FIG. 1, methane-containing feed 1, typically natural gas, is catalytically reacted with steam in steam-methane reformer (SMR) 101 as is known in the art to yield reformate 3 containing hydrogen, carbon oxides, unreacted methane, and residual water. A portion 4 of feed 1 is used as fuel 5 for combustion within SMR 101 to generate the required heat for the endothermic reforming reactions. Flue gas 6 comprising combustion products and optionally additional carbon dioxide is discharged to the atmosphere. The concentration of the carbon oxide species (i.e. carbon monoxide and carbon dioxide) in reformate 3 will depend upon whether steam-methane reformer 101 includes a water gas shift step which converts carbon monoxide to additional hydrogen and carbon dioxide. As earlier discussed, the shift step is used to maximize hydrogen production when hydrogen is the sole end product, and in this disclosure the shift step is included in SMR 101. The bulk of the water present in the shift effluent is condensed within SMR 101 (not shown). Steam reformate 3 at PSA feed pressure and 80°–100° F. is combined with either or both of the compressed recycle streams 7 and 9 (later defined). Combined stream 11, at a pressure between 100 and 1000 psig, preferably 150–600 psig, is fed to pressure swing adsorption system 103 typically at ambient temperature.

PSA system 103 is a multiple-bed adsorption system which separates gas mixtures by selective adsorption using pressure swing for adsorption and desorption between higher and lower pressures, as is well known in the art. In some cases, the lower pressure can be subatmospheric. In this specification, the term PSA includes any cyclic adsorption process which utilizes steps at superatmospheric or subatmospheric pressures. PSA system 103 produces a high purity hydrogen product 13 (the least strongly adsorbable component) essentially free of the secondary components and containing at least 98 vol % hydrogen at a pressure between 150 and 600 psig. Hydrogen recovery from the feed gas is typically 75 to 90%. PSA system 103 utilizes multiple adsorber vessels each of which operates cyclically in a sequential series of feed, depressurization, purge, and repressurization steps as is well known in the art. Other steps such as pressure equalization between adsorber vessels are commonly used to improve the PSA system performance.

In the operation of one of the multiple adsorber vessels, pressurized feed gas flows through the adsorber for a fixed time period or until the product purity drops below a predetermined level. At this point, the adsorber is isolated, and the pressure is reduced to near ambient by withdrawing a depressurization gas containing a mixture of void space gas and desorbed components. The hydrogen concentration in the depressurization gas initially is between about 30 and 75 mole % and decreases to a level between about 10 and 45 mole % at the end of the depressurization step. In addition, the pressure and flow rate of the depressurization gas decrease as the depressurization step proceeds. FIG. 2A illustrates a typical curve of the depressurization gas composition as a function of pressure. Initially, depressurization begins at initial pressure of $P_1$ (about 20 to 100% of the pressure in the adsorption step) and decreases over time to a pressure $P_0$ which is close to atmospheric pressure. The depressurization step typically occurs over a time period of 10 to 140 seconds. In the depressurization curve of FIG. 2A, for example, the initial depressurization gas is at 9.5 bar and contains 70 mole % hydrogen, and the final depressurization gas is at 1.6 bar and contains 40 mole % hydrogen. The hydrogen concentration in the depressurization gas decreases as the depressurization step proceeds.

At the completion of the depressurization step, the adsorber is purged at $P_0$ with a gas low in methane and carbon oxides; the usual purge gas is a portion of the high purity hydrogen PSA product although other appropriate purge gases can be used. The concentration of hydrogen in the purge effluent gas begins at a low level and increases as the residual adsorbed components are desorbed. The typical purge step has a duration of 30 to 240 seconds. FIG. 2B is a plot illustrating the concentration of hydrogen in a typical purge effluent gas as a fraction of purge effluent gas quantities. In this purge step, for example, the initial hydrogen concentration is 23 mole % and the final concentration is 50 mole %. Thus the hydrogen concentration increases as the purge step proceeds.

In the present invention, the depressurization gas is divided as a function of time into two or more streams, each of which has a different average hydrogen concentration, pressure, and flow rate. Each fraction can be collected in a holdup tank if desired (not shown) to equalize the gas concentration and pressure, and to deliver the gas at a constant flow rate. Referring again to the schematic flowsheet of FIG. 1, the depressurization gas is divided and collected in three portions as a function of time. These portions are shown as individual depressurization gas streams 15, 17, and 19 which have decreasing hydrogen concentrations as depressurization proceeds from $P_1$ to $P_0$ as given in FIG. 2A. In addition, the purge effluent gas optionally is divided as a function of time into two or more streams, each of which has a different average hydrogen concentration but essentially are at the same pressures. Each fraction can be collected in a holdup tank if desired (not shown) to equalize the gas concentration and pressure, and to deliver the gas at a constant flow rate. Referring again to the schematic flowsheet of FIG. 1, the purge effluent gas is divided and collected in two portions as a function of time. This is shown as individual purge effluent gas streams 21 and 23 which have increasing hydrogen concentrations as the purge effluent gas quantity fraction changes from 0 to 1 as given in FIG. 2B.

Depressurization gas streams 15, 17, and 19 as well as purge effluent streams 21 and 23 are enriched in the secondary components methane, carbon monoxide, and carbon dioxide according to the separation effected in PSA system 103. These streams also contain some hydrogen lost in the depressurization and purge steps. In the present invention, at least one and preferably more than one of the segregated depressurization gas and purge effluent gas streams is further processed in an adsorbent membrane separator to concentrate the hydrogen contained therein for recycle to PSA system 103. This enrichment and recycle of selected portions of the depressurization and purge effluent gas streams is generically described by the term fractionated recycle, and serves to increase the overall recovery of hydrogen in reformate 3 as high purity hydrogen product 13.

First depressurization gas stream 15 is introduced into adsorbent membrane separation zone 105 to concentrate the hydrogen and reject the other components present therein. Membrane separation zone 105 is separated into feed side 107 and permeate side 109 by adsorbent membrane 111 which comprises adsorbent material supported by a porous substrate in which the adsorbent material is a coating on the surface of the substrate. Alternatively, some or all of the adsorbent material is contained within the pores of the substrate. The adsorbent material typically is selected from activated carbon, zeolite, activated alumina, silica, or combinations thereof. The characteristics and methods of preparation of adsorbent membranes are described in U.S. Pat. No. 5,104,425 which has been incorporated herein by reference. A representative type of membrane for use in the present invention is made by coating a porous graphite substrate with a thin film of an aqueous suspension (latex) containing a polyvinylidine chloride polymer, drying the coated substrate at 150° C. for five minutes, heating the substrate in nitrogen to 600°–1000° C. at a rate of 1° C. per minute, holding at temperature for three hours, and cooling to ambient temperature at 1°–10° C. per minute. The polymer coating is carbonized during the heating step thereby forming an ultrathin layer of microporous carbon on the substrate. Other polymers can be used for coating prior to the carbonization step provided that these polymers can be carbonized to form the required porous carbon adsorbent material. Such alternate polymers can be selected from polyvinyl chloride, polyacrylonitrile, styrene-divinylbenzene copolymer, and mixtures thereof.

The adsorbent membrane and substrate can be fabricated in a tubular configuration in which the microporous adsorbent material is deposited on the inner and/or outer surface of a tubular porous substrate, and the resulting tubular adsorbent membrane elements can be assembled in a shell-and-tube configuration in an appropriate pressure vessel to form a membrane module. Alternatively, the adsorbent membrane and support can be fabricated in a flat sheet configuration which can be assembled into a module using a plate-and-frame arrangement. Alternatively, the adsorbent membrane and support can be fabricated in a monolith or multichannel configuration to provide a high membrane surface area per unit volume of membrane module. The support material of the tubular membrane, the flat sheet membrane, or the monolith can be a porous ceramic, porous glass, porous metal, or a porous carbon material. A hollow fiber configuration may be used in which the adsorbent membrane is supported by fine hollow fibers of the substrate material. A plurality of membrane modules in parallel and/or series can be utilized when gas feed rates and separation requirements exceed the capability of a single module of practical size. Each of these configurations separates the membrane zone into a feed side and permeate side as illustrated in schematic fashion as membrane zone 105 in FIG. 1.

Depressurization gas 15 is passed through feed side 107 of membrane zone 105, and portions of the carbon oxides and methane contained therein selectively adsorb and permeate through adsorbent membrane 111 by the dominant mechanism of selective surface flow in the mobile adsorbed phase. The resulting separation yields permeate 25 which is enriched in the carbon oxides and methane, and nonpermeate 27 which is enriched in hydrogen. Nonpermeate stream 27 is at a pressure slightly less than feed 15 due to the small pressure drop through feed side 107 while permeate 25 is at a significantly lower pressure, typically between 2 and 25 psia. Nonpermeate 27 is compressed to 150–600 psig by compressor 113 to yield recycle stream 9 which is combined with reformate 3 to provide feed 11 to PSA system 103.

Optionally, the performance of membrane zone 105 can be enhanced further by providing sweep gas 29 to sweep permeate side 109 which increases the effective partial pressure driving force across membrane 111 for the selectively permeating components and in turn increases the net permeation rate for the more strongly adsorbed carbon oxides and methane. The sweep-to-feed ratio (the ratio of the molar flow rates of sweep 29 to feed 15) is between 0.05 and 0.5, and preferably between 0.05 and 0.25. Depending upon the type, pressure, and flow rate of the sweep gas and the method of distributing the sweep gas across the membrane, benefits can be realized in the operation of membrane zone 105. Such benefits include increased separation efficiency and reduced membrane area which result from increased driving force for the permeation of the strongly adsorbed components. Methane and hydrogen are effective sweep gases, and are readily available as a portion of methane feed 1 or alternately as a carefully controlled portion of high purity hydrogen product 13. Other sweep gases can be used if compatible with recycle of permeate to the steam-methane reformer and nonpermeate to the PSA system.

Figure 3A:
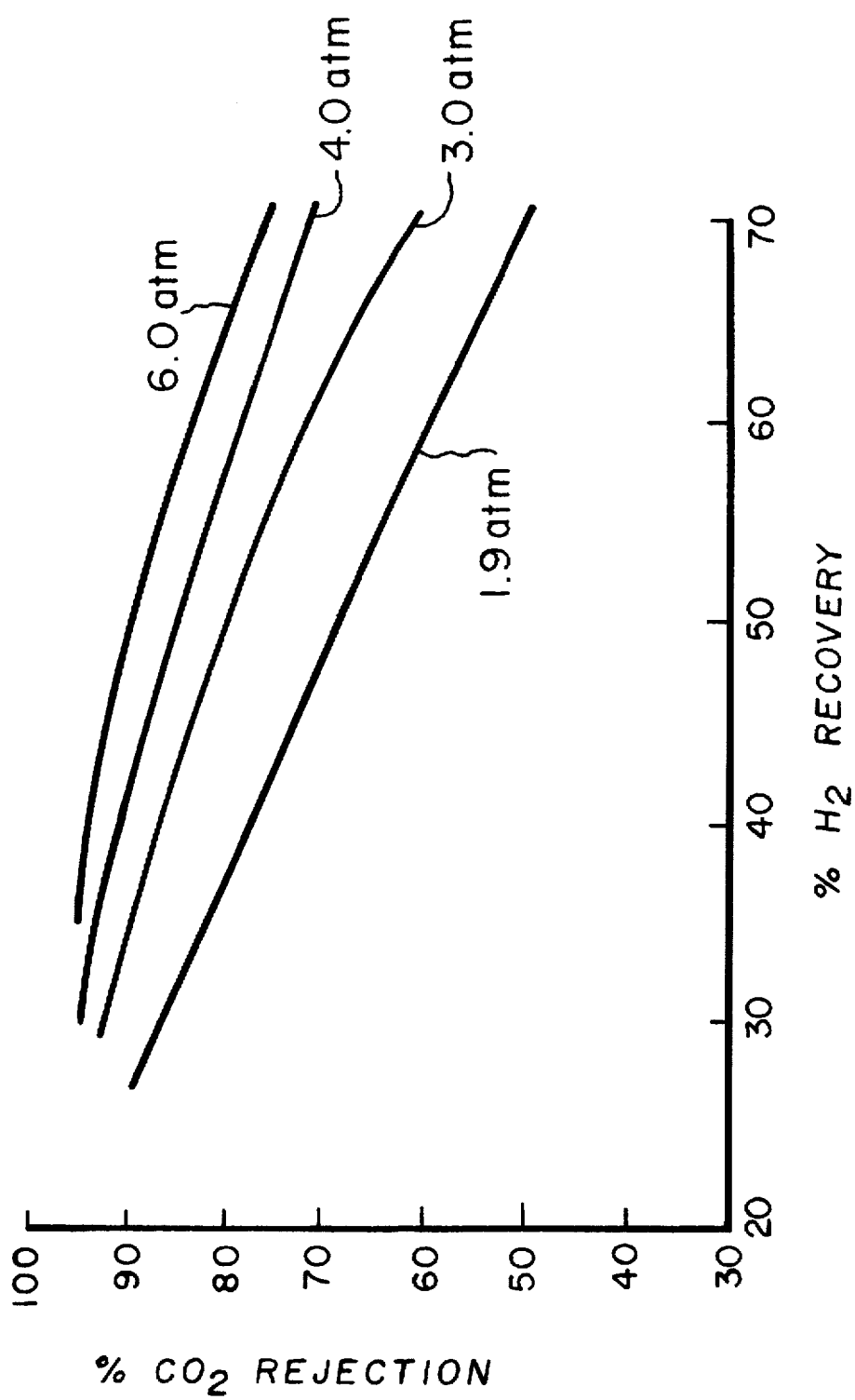
FIG. 3A is a plot of carbon dioxide rejection vs hydrogen recovery at various pressures in the separation of a mixture of carbon dioxide, methane, and hydrogen by an adsorbent membrane system.
Figure 3B:
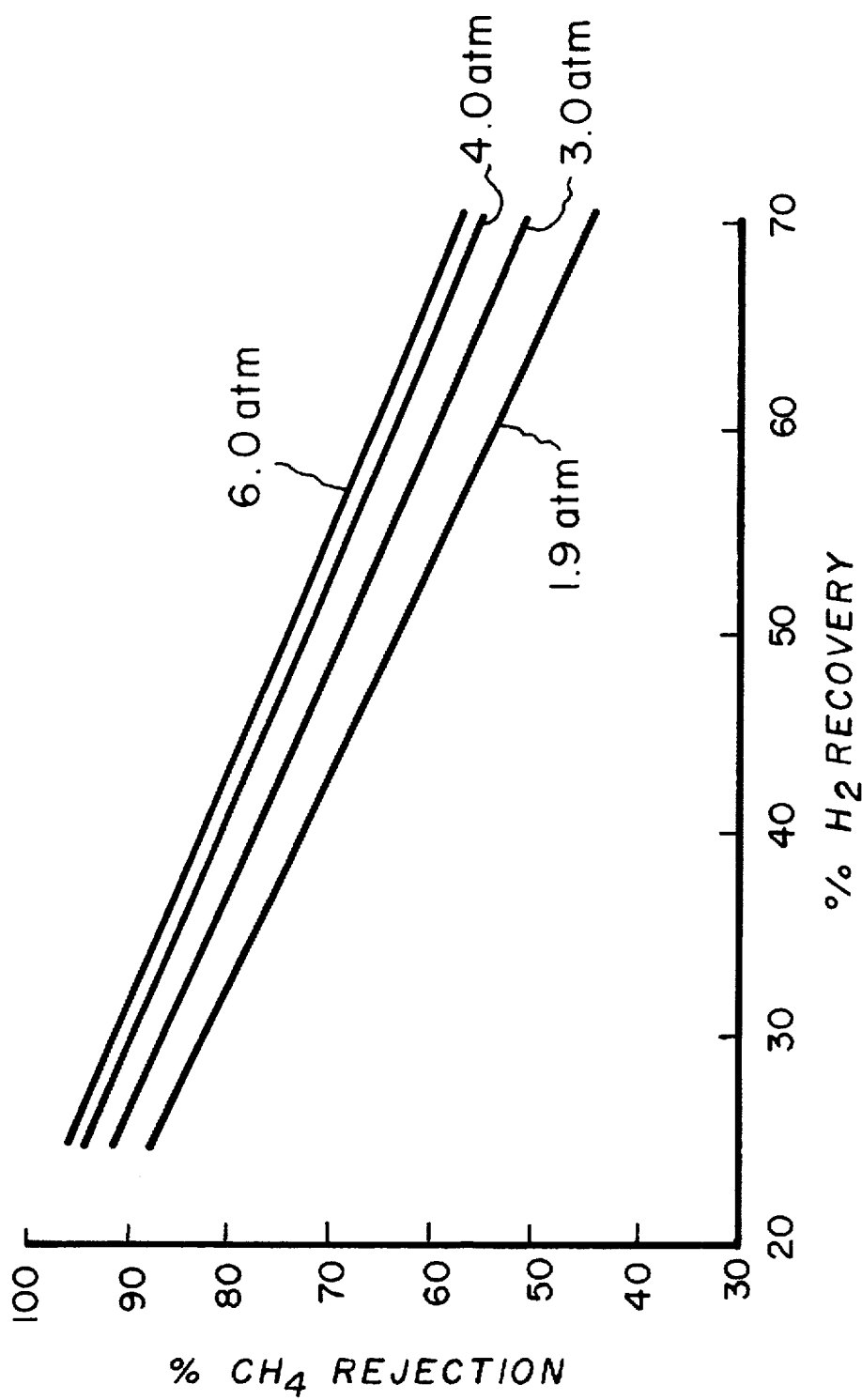
FIG. 3B is a plot of methane rejection vs hydrogen recovery at various pressures in the separation of a mixture of carbon dioxide, methane, and hydrogen by an adsorbent membrane system.

The performance of a typical adsorbent membrane separator is illustrated in FIGS. 3A and 3B for the rejection of carbon dioxide and methane respectively from a feed gas mixture containing 36 mole % hydrogen, 54 mole % carbon dioxide, and 10 mole % methane at feed pressures of 1.9, 3.0, 4.0, and 6.0 atm. No sweep gas is used on the permeate side of the separator, which operates at 1.2 atm total pressure. FIG. 3A gives the % rejection of carbon dioxide (i.e. the percent of the carbon dioxide removed from the feed gas by permeation) from the feed as a function of the % hydrogen recovery (i.e. the percent of hydrogen recovered in the nonpermeate side from the feed) for different feed gas pressures. It is seen that hydrogen recovery increases while the carbon dioxide rejection decreases, and also that membrane performance improves (higher carbon dioxide rejection and higher $H_2$ recovery) as the feed pressure is increased. FIG. 3B gives the % rejection of methane (i.e. the percent of the methane removed from the gas by permeation) in the feed as a function of the % hydrogen recovery for different feed pressures. It is seen that hydrogen recovery increases as the methane rejection decreases, and also that membrane performance improves (higher methane rejection and higher $H_2$ recovery) as the feed pressure is increased. In a typical operation with this feed gas, 80% of the carbon dioxide and 73% of the methane are rejected at 3.0 bar feed gas pressure to recover 50% of the hydrogen at essentially the feed pressure.

Second depressurization gas stream 17 optionally is processed in additional membrane separation zone 115 in which the stream is passed through feed side 117 of membrane zone 115, and portions of the carbon oxides and methane contained therein selectively adsorb and permeate through adsorbent membrane 119 by the dominant mechanism of selective surface flow in the mobile adsorbed phase. The pressure of depressurization gas 17 is lower than that of depressurization gas 15 because, as earlier discussed and illustrated by FIG. 2A, the depressurization step occurs over a range of decreasing pressure. The resulting separation yields permeate 32 which is enriched in carbon oxides and methane, and nonpermeate 33 which is enriched in hydrogen. Nonpermeate stream 33 is at a pressure slightly less than feed 17 due to the small pressure drop through feed side 117 while permeate 32 is at a significantly lower pressure, typically between 2 and 25 psia. Nonpermeate 33 is compressed to 150–600 psig by compressor 125 to yield recycle stream 7 which is combined with reformate 3 to provide feed 11 to PSA system 103. Optionally, permeate side 121 of membrane separation zone 115 can be swept with sweep gas 35 to improve the permeation rate across adsorbent membrane 119 to yield combined sweep gas and permeate stream 31. Permeate/sweep gas 32 is combined with permeate/ sweep gas 25 and utilized as additional fuel 31 to replace a portion of fuel 4 in fuel 5 to SMR 101.

Membrane separation zones 105 and 115 differ in operating pressure and possibly surface area because fractionated depressurization gas streams 15 and 17 differ in pressure and may differ in amount or gas composition. Compressors 113 and 125 thus will differ in compression ratio and possibly in volumetric flow capacity.

Third depressurization gas stream 19 is at the lowest pressure and has the lowest hydrogen concentration of depressurization gas streams 15, 17, and 19. For this reason, depressurization gas stream 19 preferably is utilized for a portion of fuel 31 to SMR system 101.

Thus one embodiment of the present invention is the fractionation of PSA depressurization gas into two or more fractions having different compositions, pressures, and quantities. The further processing or use of these fractions will depend on the composition of the streams relative to the composition of reformate 3 and other factors. At least one of these streams preferably is further processed in an adsorbent membrane system and the hydrogen-enriched nonpermeate stream is recycled to the PSA system for improved hydrogen recovery.

In another embodiment of the invention, the PSA purge effluent gas is collected as first purge effluent gas 21 and second purge effluent gas 23. These effluent gas streams will differ in composition as discussed above, but usually will be similar in pressure. First purge effluent gas portion 21 will have a lower hydrogen concentration than second effluent gas portion 23 and is utilized as part of the fuel stream 5 for the SMR 101. The second purge effluent stream 23 can be compressed in compressor 123 and combined with the second portion of the depressurization gas (stream 17) and fed to membrane zone 115 to further increase the overall hydrogen recovery of the process.

Depressurization gas streams 15, 17, and 19, as well as purge effluent gas streams 21 and 23, will have different compositions depending on the composition of reformate 3 and the operating parameters of PSA system 103. As a result, the processing of these streams as described above can be modified as necessary to optimize the overall operation of the combined system. For example, the composition of a depressurization gas stream during a certain time period may be such that the stream preferably is recycled directly to PSA system 103 after recompression without processing in an adsorbent membrane separation step. The composition of the purge effluent gas streams could be such that both are processed in an adsorbent membrane system. Alternatively, the purge effluent gas may not be segregated into two streams as discussed above, and instead all purge effluent gas could be used as fuel in SMR 101. The relative value of methane-containing feed 1 and hydrogen product 13 may influence the choices for utilizing the depressurization gas and purge effluent gas streams. The various options for utilization of these streams allow flexible operation of the combined SMR-PSA-adsorbent membrane system.

Thus according to the present invention either the depressurization gas or the purge effluent gas is segregated into two or more individual streams and at least one of those streams is processed in an adsorbent membrane separator with the nonpermeate stream recycled to the PSA system. Preferably both the depressurization gas and the purge effluent gas are segregated into individual streams as described above, at least one of the streams is processed in an adsorbent membrane separator with the nonpermeate stream recycled to the PSA system, and one or more of the segregated streams are utilized as fuel in SMR 101. Optionally one or more of the segregated streams can be recycled directly to PSA system 103.

The benefits of the invention can be applied to increase the hydrogen recovery in an existing SMR-PSA system by retrofitting the system with one or more adsorbent membrane separators and the associated gas handling equipment. Alternatively, the present invention can be utilized in the design of a new hydrogen production facility to decrease the size of the SMR and reduce the net natural gas requirement for the SMR. In another mode of application, use of the present invention in a new facility can simplify the PSA design, resulting in fewer adsorbers and a simpler PSA process cycle, which in turn leads to a lower cost system. However, the integrated PSA-adsorbent membrane system will provide an increased overall $H_2$ recovery from stream 3 of FIG. 1. If the invention of FIG. 1 were not utilized, a more complicated PSA system using a larger number of adsorbers would be needed to achieve the same hydrogen recovery. The benefits of the invention are illustrated in the Examples which follow.

EXAMPLE 1

The invention is utilized to improve the productivity of an existing PSA system by processing portions of the depressurization gas and purge effluent gas as described above. A PSA system operates at a feed pressure of 19.5 bar and produces 20 million standard cubic feet per day (SCFD) of high purity hydrogen product. The hydrogen recovery of the PSA system is 77% from 35.32 million SCFD of feed gas which contains 73.5 mole % hydrogen, 20 mole % carbon dioxide, and approximately 6.5 mole % methane plus carbon monoxide (dry basis). A total of about 6.0 million SCFD of hydrogen is lost from the PSA system in the reject gas from the depressurization and purge steps. In order to recover some of the lost hydrogen, two adsorbent membrane separators are integrated with the PSA system in a manner illustrated in FIG. 1. First portion 15 of the depressurization gas is obtained between pressures of 7.8 bar and 5.2 bar, and the gas is passed through adsorbent membrane separation zone 105 at 5.2 bar to produce hydrogen-enriched nonpermeate 27 containing 62.2 mole % hydrogen, 25.4 mole % carbon dioxide, and 11.2 mole % methane plus carbon monoxide.

Nonpermeate 27 is compressed in compressor 113 to 19.5 bar to yield compressed recycle stream 9 which is combined with reformate 3 to yield PSA feed 11. Second portion 17 of the depressurization gas is obtained between pressures of 5.2 bar and 3.6 bar, and the gas is passed through adsorbent membrane separation zone 115 at 3.6 bar to produce hydrogen-enriched nonpermeate 33 containing 56.8 mole % hydrogen, 27.6 mole % carbon dioxide, and 15.6 mole % methane plus carbon monoxide. Nonpermeate 33 is compressed in compressor 125 to 19.5 bar to yield compressed recycle stream 7 which is combined with reformate 3 to yield PSA feed 11. First portion 21 of the purge gas effluent at 1.6 bar is used as fuel in SMR 101. Second portion 23, which is richer in hydrogen than first portion 21, is compressed to 3.6 bar in compressor 123 and the compressed stream is combined with second portion 17 of the depressurization gas prior to adsorbent membrane separation zone 115. This increases the hydrogen content in hydrogen-enriched nonpermeate 33, which now has a composition of 60.3 mole % hydrogen, 16.8 mole % carbon dioxide, and 22.9 mole % methane plus carbon oxide. Nonpermeate 33 is compressed to 19.5 bar and the resulting compressed gas 7 is combined with reformate 3 to yield PSA feed 11.

As a result of using adsorbent membrane separation zones 105 and 115, a total of 6.1 million SCFD of gas containing 61.0 mole % hydrogen (recycle streams 7 and 9) is returned to the PSA system. Total PSA feed 11 (fresh reformate 3 plus recycle streams 7 and 9) is 41.4 million SCFD containing 71.7 mole % hydrogen. Thus an additional 2.8 million SCFD of high purity hydrogen product is recovered in hydrogen product 13, which represents a net production increase of 14.3%. The overall hydrogen recovery of PSA system 103 is increased from 77% to 88%.

EXAMPLE 2

A PSA system produces 20 million SCFD of high purity hydrogen from 34.9 million SCFD of SMR product gas containing 73.5 mole % hydrogen. The depressurization and purge effluent gas streams are used as fuel for the SMR, and the total amount of hydrogen in these streams is 5.65 million SCFD. When a portion of this hydrogen is recovered by processing the depressurization and purge effluent gas streams in adsorbent membrane separators as described in Example 1, less reformate (stream 3) is needed to produce the same amount of hydrogen product, and in turn a smaller SMR is required which uses less natural gas (methane) feed. The relative reduction in SMR size and natural gas feed was calculated as a function of the fraction of hydrogen recovered from the streams for recycle and recovery in the PSA system. The results are summarized in Table 1 below.

TABLE 1

Reduction in SMR Size and Natural Gas Requirements by Adsorbent Membrane Processing of PSA Depressurization and Purge Effluent Gas

| Fraction of hydrogen recovered from depressurization and purge effluent gas | Net reduction in SMR Size | Net reduction in SMR natural gas requirement |
|---|---|---|
| 0.4 | 8.8% | 2.7% |
| 0.5 | 11.0% | 3.4% |
| 0.6 | 13.2% | 4.1% |

This Example illustrates the benefits associated with adsorbent membrane processing of PSA depressurization and purge effluent gas, which yield significant reductions in the SMR size and natural gas requirements.

EXAMPLE 3

A further improvement in the design of the SMR-PSA system of FIG. 1 for production of high purity hydrogen product can be achieved by the use of adsorbent membrane separators. PSA systems often are designed to obtain high specific hydrogen recoveries (e.g. above 85%) by introducing several pressure equalization steps between a given adsorber vessel and other adsorber vessels following the adsorption step. This often requires the use of 10 to 12 adsorber vessels in the PSA system. The adsorbent membrane-PSA integration concept can be used to simplify the PSA system and operation while obtaining high (>85%) hydrogen recovery from the reformate feed gas. For example, a simpler PSA design with fewer pressure equalization steps can be used to obtain about 78% specific hydrogen recovery using only 4 to 6 adsorber vessels. The integration of such a simplified PSA system with an adsorbent membrane system can yield a hydrogen recovery of above 85% as illustrated in Example 1. For example, a PSA system with 10 adsorber vessels has a specific hydrogen recovery of 84% from a reformate feed gas containing 73.5 mole % hydrogen. A simplified PSA system with 5 adsorber vessels which has a specific hydrogen recovery of only 78% can be integrated with two adsorbent membrane separators as shown in FIG. 1 so that 50% of the hydrogen in the PSA depressurization and purge effluent gas streams is recovered for recycle to the PSA system. The overall hydrogen recovery of the integrated system is 87.3% and the net hydrogen production rate is identical to that of the 10 adsorber PSA system without adsorbent membrane separators. For the integrated system, the size of the SMR is reduced by 4.2% and the total natural gas requirement for the process is reduced by about 0.6% compared with the 10 adsorber PSA system.

Thus the present invention provides a method for increasing hydrogen product recovery or reducing the size of steam methane reformers which utilize pressure swing adsorption systems for final hydrogen product purification. A significant portion of the hydrogen in the PSA depressurization and purge effluent gas, which is otherwise burned as fuel in the reformer, can be recovered by an adsorbent membrane system and recycled to the PSA system to provide additional high purity hydrogen product. Remaining portions of the depressurization and purge effluent gas which contain lower concentrations of hydrogen are utilized for fuel value in the reformer.

In addition to applications in separating steam-methane reformate gas mixtures as described above, the present invention can be used to improve the performance of PSA systems for separating other gas mixtures which contain primary components and secondary components. Such mixtures include refinery waste streams containing hydrogen and light hydrocarbons, mixtures of helium and natural gas components, and other mixtures containing lower molecular weight, weakly-adsorbed components and higher molecular weight, strongly-adsorbed components.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. In a pressure swing adsorption process which separates a pressure swing adsorption feed gas mixture comprising one or more primary components and one or more secondary components into a product stream enriched in the primary components and one or more reject streams enriched in the secondary components, wherein the secondary components are more strongly adsorbed on an adsorbent material and the primary components are less strongly adsorbed on the adsorbent material, and wherein the pressure swing adsorption process includes at least the steps of (A) passing the pressure swing adsorption feed gas mixture through an adsorption zone at a first pressure wherein the secondary components are selectively adsorbed on the adsorbent material therein and a product stream enriched in primary components is withdrawn therefrom;

(B) isolating the adsorption zone and depressurizing the zone by withdrawing therefrom desorbed and void space gas as a stream of depressurization gas; and (C) purging the resulting depressurized adsorption zone of step (b) with a purge gas stream and withdrawing therefrom a purge gas effluent;

a method for improving the recovery of the primary components in the product stream which comprises:

(1) selectively segregating either the depressurization gas or the purge effluent gas by
  (1a) dividing the depressurization gas into at least a first portion obtained during a first period of the depressurization step and a second portion obtained during a second period of the depressurization step; or
  (1b) dividing the purge effluent gas into at least a first portion obtained during a first period of the purge step and a second portion obtained during a second period of the purge step;
(2) passing either the first portion of depressurization gas or the second portion of the purge effluent gas as a membrane feed gas through a membrane separation zone having a permeable adsorbent membrane which divides the zone into a feed side and a permeate side, wherein the membrane feed gas passes through the feed side of the membrane separation zone and portions of the secondary components selectively adsorb and permeate through the membrane to the permeate side;
(3) withdrawing from the permeate side of the membrane separation zone a permeate stream which is further enriched in the secondary components and withdrawing from the feed side of the membrane separation zone a nonpermeate stream which is depleted in the secondary components and enriched in the primary components; and
(4) combining the nonpermeate stream with the pressure swing adsorption feed gas mixture and passing the resulting combined gas stream through the adsorption zone.

2. The method of claim 1 wherein the depressurization gas is divided into at least a first portion obtained during a first period of the depressurization step and a second portion obtained during a second period of the depressurization step, and wherein the method comprises
  (a) passing the first portion of depressurization gas as the membrane feed gas through the membrane separation zone having a permeable adsorbent membrane which divides the zone into a feed side and a permeate side, wherein the depressurization gas passes through the feed side of the membrane separation zone and portions of the secondary components selectively adsorb and permeate through the membrane to the permeate side;
  (b) withdrawing from the permeate side of the membrane separation zone the permeate stream which is further enriched in the secondary components and withdrawing from the feed side of the membrane separation zone the nonpermeate stream which is depleted in the secondary components and enriched in the primary components; and
  (c) recycling the nonpermeate stream to the pressure swing adsorption process to increase the recovery of the primary components in the product stream.

3. The method of claim 2 wherein the secondary components comprise methane and carbon oxides, and the primary components comprise hydrogen.

4. The method of claim 3 wherein the pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor.

5. The method of claim 4 wherein the second portion of depressurization gas obtained during the second period of the depressurization step is utilized as additional fuel to provide heat for the steam reforming reactor.

6. The method of claim 4 wherein the permeate stream which is further enriched in the secondary components is utilized as additional fuel to provide heat for the steam reforming reactor.

7. The method of claim 4 which further comprises sweeping the permeate side of the membrane separation zone with a sweep gas, withdrawing therefrom a mixture of permeate and sweep gas, and utilizing the mixture as additional fuel to provide heat for the steam reforming reactor.

8. The method of claim 2 wherein the purge effluent gas is divided into at least a first portion obtained during a first period of the purge step and a second portion obtained during a second period of the purge step, and wherein the method further comprises
  (d) passing the second portion of purge effluent gas as the membrane feed gas through an additional membrane separation zone having a permeable adsorbent membrane which divides the zone into a feed side and a permeate side, wherein the membrane feed gas passes through the feed side of the additional membrane separation zone and portions of the secondary components selectively adsorb and permeate through the membrane to the permeate side;
  (e) withdrawing from the permeate side of the additional membrane separation zone an additional permeate stream which is further enriched in the secondary components and withdrawing from the feed side of the additional membrane separation zone an additional nonpermeate stream which is depleted in the secondary components and enriched in the primary components; and
  (f) recycling the additional nonpermeate stream to the pressure swing adsorption process to increase the recovery of the primary components in the product stream.

9. The method of claim 8 wherein the secondary components comprise methane and carbon oxides, and the primary components comprise hydrogen.

10. The method of claim 9 wherein the pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor.

11. The method of claim 10 wherein the additional permeate stream which is further enriched in the secondary components is utilized as additional fuel to provide heat for the steam reforming reactor.

12. The method of claim 10 which further comprises sweeping the permeate side of the additional membrane separation zone with a sweep gas, withdrawing therefrom a mixture of permeate and sweep gas, and utilizing the mixture as additional fuel to provide heat for the steam reforming reactor.

13. The method of claim 10 wherein the first portion of purge effluent gas is utilized as additional fuel to provide heat for the steam reforming reactor.

14. The method of claim 2 which further comprises
  (d) passing the second portion of depressurization gas as a membrane feed gas through an additional membrane separation zone having a permeable adsorbent membrane which divides the zone into a feed side and a permeate side, wherein the membrane feed gas passes through the feed side of the additional membrane separation zone and portions of the secondary components selectively adsorb and permeate through the membrane to the permeate side;

(e) withdrawing from the permeate side of the additional membrane separation zone an additional permeate stream which is further enriched in the secondary components and withdrawing from the feed side of the additional membrane separation zone an additional nonpermeate stream which is depleted in the secondary components and enriched in the primary components; and (f) recycling the additional nonpermeate stream to the pressure swing adsorption process to increase the recovery of the primary components in the product stream.

15. The method of claim 14 wherein the secondary components comprise methane and carbon oxides, and the primary components comprise hydrogen.

16. The method of claim 15 wherein the pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor.

17. The method of claim 16 wherein the additional permeate stream which is further enriched in the secondary components is utilized as additional fuel to provide heat for the steam reforming reactor.

18. The method of claim 16 which further comprises sweeping the permeate side of the additional membrane separation zone with a sweep gas, withdrawing therefrom a mixture of permeate and sweep gas, and utilizing the mixture as additional fuel to provide heat for the steam reforming reactor.

19. The method of claim 16 which further comprises dividing the depressurization gas into a third portion obtained during a third period of the depressurization step and utilizing the third portion of depressurization gas as additional fuel to provide heat for the steam reforming reactor.

20. The method of claim 14 wherein the purge effluent gas is divided into at least a first portion obtained during a first period of the purge step and a second portion obtained during a second period of the purge step, and wherein the second portion of purge effluent gas is combined with the second portion of depressurization gas and passed through the additional membrane separation zone.

21. The method of claim 20 wherein the secondary components comprise methane and carbon oxides, and the primary components comprise hydrogen.

22. The method of claim 21 wherein the pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor.

23. The method of claim 22 wherein the additional permeate stream which is further enriched in the secondary components is utilized as additional fuel to provide heat for the steam reforming reactor.

24. The method of claim 22 which further comprises sweeping the permeate side of the additional membrane separation zone with a sweep gas, withdrawing therefrom a mixture of permeate and sweep gas, and utilizing the mixture as additional fuel to provide heat for the steam reforming reactor.

25. The method of claim 22 wherein the first portion of purge effluent gas is utilized as additional fuel to provide heat for the steam reforming reactor.

26. The method of claim 25 which further comprises dividing the depressurization gas into a third portion obtained during a third period of the depressurization step and utilizing the third portion as additional fuel to provide heat for the steam reforming reactor.

27. The method of claim 1 wherein the depressurization gas is divided into at least a first portion obtained during a first period of the depressurization step and a second portion obtained during a second period of the depressurization step, and wherein the method comprises (a) passing the second portion of depressurization gas as the membrane feed gas through an additional membrane separation zone having a permeable adsorbent membrane which divides the zone into a feed side and a permeate side, wherein the depressurization gas passes through the feed side of the additional membrane separation zone and portions of the secondary components selectively adsorb and permeate through the membrane to the permeate side;

(b) withdrawing from the permeate side of the additional membrane separation zone an additional permeate stream which is further enriched in the secondary components and withdrawing from the feed side of the membrane separation zone an additional nonpermeate stream which is depleted in the secondary components and enriched in the primary components; and (c) recycling the additional nonpermeate stream to the pressure swing adsorption process to increase the recovery of the primary components in the product stream.

28. The method of claim 27 which further comprises recycling the first portion of depressurization gas to the pressure swing adsorption process to further increase the recovery of the primary components in the product stream.

29. The method of claim 28 wherein the pressure swing adsorption feed gas mixture is provided by steam reformation of a hydrocarbon feedstock in a steam reforming reactor, wherein a portion of the feedstock provides the reactant for the steam reforming reactor and the remaining feedstock provides fuel which is combusted to provide heat for the steam reforming reactor, and further wherein the depressurization gas is divided into a third portion obtained during a third period of the depressurization step and the third portion is utilized as additional fuel to provide heat for the steam reforming reactor.

\* \* \* \* \*